(12) United States Patent
Khi et al.

(10) Patent No.: US 10,311,250 B2
(45) Date of Patent: Jun. 4, 2019

(54) METHOD AND SYSTEM FOR MANAGING PERSONAL INFORMATION WITHIN INDEPENDENT COMPUTER SYSTEMS AND DIGITAL NETWORKS

(71) Applicant: Vchain Technology Limited, London (GB)

(72) Inventors: Irra Ariella Khi, London (GB); Aleksandr Gorelik, RishonLeTsiyon (IL)

(73) Assignee: VCHAIN TECHNOLOGY LIMITED, London (GB)

( * ) Notice: Subject to any disclaimer, the term of this patent is extended or adjusted under 35 U.S.C. 154(b) by 20 days.

(21) Appl. No.: 15/480,313

(22) Filed: Apr. 5, 2017

(65) Prior Publication Data

US 2017/0286717 A1    Oct. 5, 2017

Related U.S. Application Data

(60) Provisional application No. 62/318,648, filed on Apr. 5, 2016.

(51) Int. Cl.
*H04L 29/06* (2006.01)
*G06F 21/62* (2013.01)
(Continued)

(52) U.S. Cl.
CPC .... *G06F 21/6245* (2013.01); *G06F 17/30964* (2013.01); *G06F 21/602* (2013.01);
(Continued)

(58) Field of Classification Search
CPC .......... G06F 21/6245; G06F 17/30964; G06F 21/602; H04L 9/00; H04L 9/0861;
(Continued)

(56) References Cited

U.S. PATENT DOCUMENTS

| 9,069,979 B2 | 6/2015 | Srinivasan et al. |
| 9,276,942 B2 | 3/2016 | Srinivasan et al. |

(Continued)

OTHER PUBLICATIONS

CN, Notification of the First Office Action, Chinese Patent Application 201380072165.3, dated Feb. 28, 2017.
(Continued)

*Primary Examiner* — Ghodrat Jamshidi
(74) *Attorney, Agent, or Firm* — Orrick, Herrington & Sutcliffe LLP

(57) ABSTRACT

A system and method for reliably and securely recording and storing all attributes of personal identification, for the identification and authorization of individual identity as well as attributes relating to it and personal data including but not limited to individual's physical description, bank details, travel history, etc. (the "Personally Identifiable Information "PII"). PII can be difficult to manage in networks where correlation between data sources is required. Thus, in some embodiments, the system combines a distributed database to create a framework for a robust security. The system manages the distributed database to associate transactions, or actions, using data, digital signatures, and/or cryptographic keys, which can be unique to an individual.

7 Claims, 11 Drawing Sheets

(51) Int. Cl.
*H04L 9/32* (2006.01)
*G06F 21/60* (2013.01)
*G06F 17/30* (2006.01)
*H04W 12/08* (2009.01)
*H04W 12/10* (2009.01)

(52) U.S. Cl.
CPC .......... *H04L 9/3218* (2013.01); *H04L 9/3236* (2013.01); *H04L 9/3247* (2013.01); *H04L 63/06* (2013.01); *H04L 63/08* (2013.01); *H04L 63/10* (2013.01); *H04L 63/12* (2013.01); *H04W 12/08* (2013.01); *H04W 12/10* (2013.01); *H04L 2209/38* (2013.01)

(58) Field of Classification Search
CPC ....... H04L 9/30; H04L 9/3239; H04L 9/3247; H04L 63/06; H04L 63/08; H04L 63/10; H04L 63/12; H04L 9/3218; H04L 9/3236; H04L 2209/38; H04W 12/08; H04W 12/10
See application file for complete search history.

(56) References Cited

U.S. PATENT DOCUMENTS

| | | | | |
|---|---|---|---|---|
| 9,767,299 | B2* | 9/2017 | Selgas | H04L 63/0442 |
| 2003/0177016 | A1* | 9/2003 | Lawhorn, Jr. | G06Q 40/02 |
| | | | | 705/30 |
| 2005/0021431 | A1* | 1/2005 | Schnoerer | G06Q 40/00 |
| | | | | 705/35 |
| 2008/0021834 | A1* | 1/2008 | Holla | G06F 21/602 |
| | | | | 705/51 |
| 2008/0294895 | A1* | 11/2008 | Bodner | G06F 21/6218 |
| | | | | 713/168 |
| 2012/0226792 | A1* | 9/2012 | Johnson | H04L 63/0272 |
| | | | | 709/223 |
| 2014/0136832 | A1* | 5/2014 | Klum | H04L 63/0428 |
| | | | | 713/150 |
| 2014/0351891 | A1* | 11/2014 | Grube | G06F 11/0727 |
| | | | | 726/3 |
| 2015/0269774 | A1* | 9/2015 | Lissone | G06Q 10/0635 |
| | | | | 345/420 |
| 2015/0371052 | A1* | 12/2015 | Lepeshenkov | H04L 63/06 |
| | | | | 713/165 |
| 2016/0127333 | A1† | 5/2016 | Sood et al. | |
| 2016/0267637 | A1* | 9/2016 | Hsiao | G06Q 30/0256 |
| 2017/0054565 | A1† | 2/2017 | Feng et al. | |
| 2017/0279783 | A1* | 9/2017 | Milazzo | H04L 63/061 |

OTHER PUBLICATIONS

Ali, Muneeb, et al., "Blockstack: Design and Implementation of a Global Naming System with Blockchains", DRAFT v4; accepted for publication at 2016 USENIX Annual Technical Conference (USENIX ATC'16) 13 pages.
BCS Identity Assurance Working Group, "Aspects of identity Yearbook 2015-16, How to recognize a good online identity scheme", pp. 1-4.
Erway, C. Chris, et al., "Dynamic Provable Data Possession", Nov. 29, 2008, pp. 1-22, Brown University, Provident, RI.
Micali, Silvio, et al., "Zero-Knowledge Sets", Laboratory for Comp. Sci, MIT, Cambridge, MA 02139; Dept. of Applied Sci, Harvard, Univ., Cambridge, MA 02138, Research at Harvard Univ. by NSF Grant ITR 0205423; NEC Laboratories, America joe@nec-labs.com; 12 pages.
Robles, Klara, "The Path to Self-Sovereign Identity", WebOfTrustInfo / ID2020designWorkshop, Apr. 26, 2016, 7 pages.
Scott, Michael, "M-Pin: A Multi-Factor Zero Knowledge Authentication Protocol," Chief Cryptographer, Certivox Labs, mike.scott@certivox.com; pp. 1-12.
Smith, Samuel M., et al., "Identity System Essentials", Evemyrn, Mar. 29, 2016, 16 pages.
Snow, Paul, et al., "Factom: Business Processes Secured by Immutable Audit Trails on the Blockchain", www.Factom.org; Ver. 1.0, Nov. 17, 2014, pp. 1-38.
Tobin, Andrew, et al., "White Paper—The Inevitable Rise of Self-Sovereign Identity", Sorvrin, Identity for all, Sorvin Foundation, sorvin.org; Sep. 29, 2016, pp. 1-23.
Vaughan, Wayne, et al., "Chainpoint—A scalable protocol for recording data in the blockchain and generating blockchain receipts", V. 1,0, Jul. 22, 2015, 6 pages.
Wilkinson, Shawn, et al., "Storj: A Peer-to-Peer Cloud Storage Network", V. 1.01, Dec. 15, 2014. pp. 1-18.
Zyskind, Guy, et al., "Decentralizing Privacy: Using Blockchain to Protect Personal Data", Conference: 2015 IEEE Security and Privacy Workshops, May 2015, 5 pages.
WO, International Search Report and Written Opinion, International Application No. PCT/IB2017/000632, dated Jul. 28, 2017.

\* cited by examiner
† cited by third party

METHOD AND SYSTEM FOR MANAGING PERSONAL INFORMATION WITHIN INDEPENDENT COMPUTER SYSTEMS AND DIGITAL NETWORKS

CROSS-REFERENCE TO RELATED APPLICATIONS

This application claims priority to U.S. Provisional Patent Application No. 62/318,648, which was filed Apr. 5, 2016. The disclosure of the Provisional Patent Application is herein incorporated by reference in its entirety and for all purposes.

FIELD

The present disclosure relates to computer security, and more specifically, but not exclusively, to a system and method for personal identification data management based on, for example, verification and authentication of the personal identification information.

BACKGROUND

Traditional and generally accepted security measures and common security infrastructure, such as passwords, key management software, and two-factor authentication approaches have failed to deliver reliable and secure protection of both the infrastructures they are meant to protect, as well as the individual user's' personal data.

The increased number of hacks, attacks, security breaches, successful fraud attempts, and stolen passwords from end-users—and even entire databases from private companies as well as public/government organizations— have led to declining trust from users regarding organizations that provision their credentials and integrity of the personal data that is used to provide user access. Generally, data compromise generates a lack of confidence in trusting personal identifiable information to anyone. This increased user fear and concern for individual data privacy, as well as personal data safety held by third parties, have led to increased technical challenges for organizations to maintain and protect the personal identifiable information of their users. For example, conventional methods typically require increased resources to improve data center monitoring and security—including firewalls, secure environments, data breach detection, penetration testing, resilience exercises against potential hacks and security breaches.

The main reason for the lack of security in conventional systems is that outdated concepts and poor fundamental design is commonly used in technologies and practices aimed at establishing and protecting identity as well as existing (or a potential user's) personal details. Most organizations using these outdated technologies are forced to store any personal data collected centrally and store the personal data "as is"—unencrypted. Even when it's encrypted, such data currently can be stolen and used elsewhere for nefarious purposes, due to the single point of compromise in the conventional approaches.

While there are many faults within conventional personal identity management systems, some examples include: storing data in its initial or apparent form; storing data in open form or un-encrypted; storing data in encrypted form that can easily be restored to their initial or open form; storing of passwords including digital keys; existence of backdoors; not decentralized, "all eggs in one basket" storage; having a single point of compromise; and conceptually offering any form of "trusted authorities."

In view of the foregoing, a need exists for an improved system for personal identity management in an effort to overcome the aforementioned obstacles and deficiencies of conventional data collection, storage, query, and management systems.

Figure 1:
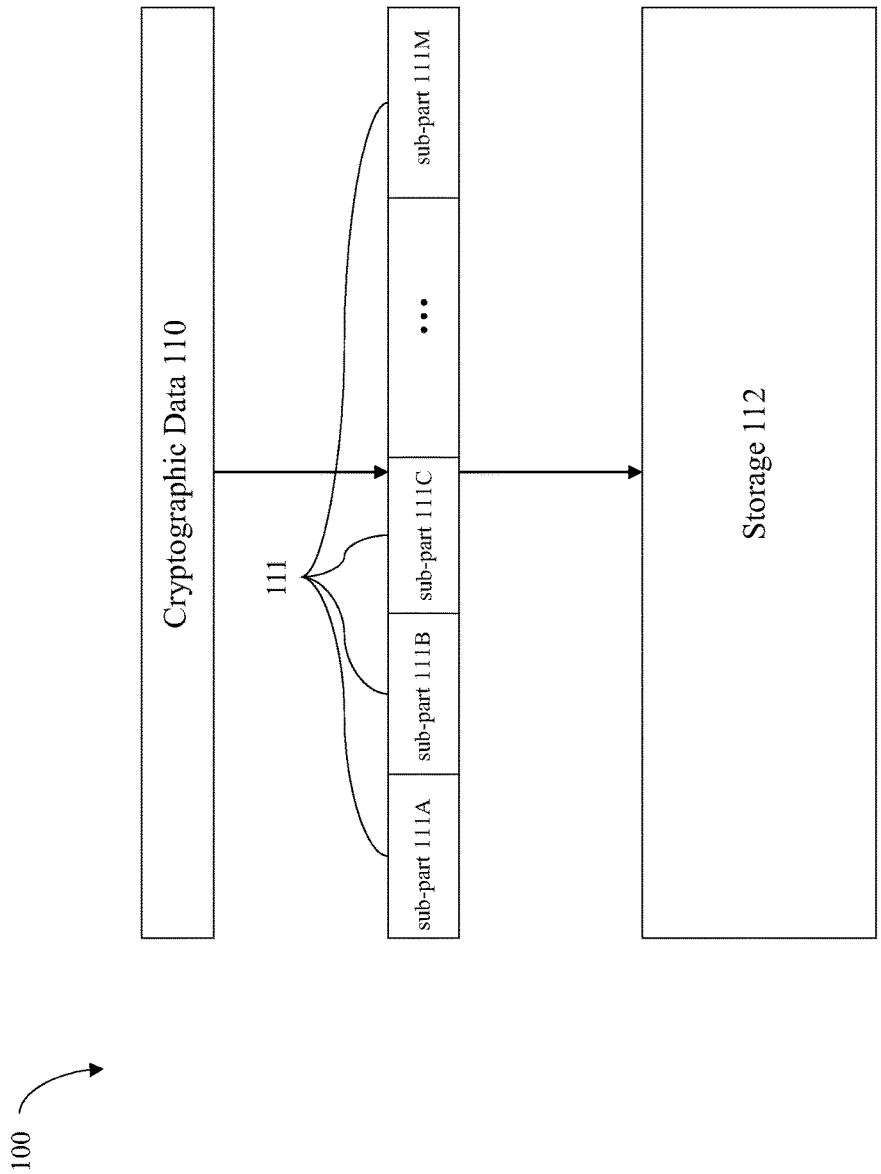
FIG. 1 is an exemplary top-level block diagram illustrating one embodiment of cryptographic data and its partition into sub-components within a storage.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION

Since currently-available personal identity management systems are deficient because of outdated data storage and data management techniques, a system for personal identity management including recording, storing, verifying, authenticating and authorizing of personal identity and its attributes as well as related personal identifiable information (PII) can prove desirable and provide a basis for a wide range of data management applications, such as for digital identity access to international travel, banking, credit, insurance, medical records, and to prevent fraud or misuse of identity information. This result can be achieved, according to one embodiment disclosed herein, by a personal identity management system 100 as illustrated in FIG. 1. As used herein, personal identity management includes the management of any data relating to an individual's identity or personal credentials that contribute toward that individual's identity, such as, for example, an individual's identity documentation (e.g., a passport, ID card, birth certificate, and so on—including not just the entire document or it's identifying unique number but also the individual data fields within them such as date of birth and place of birth), biometric data (e.g., fingerprints, voice, iris, face, height, eye and hair color), and other identification data (e.g., employee number, credit/debit cards, access codes, log ins, bookings, etc.).

Turning to FIG. 1, the personal identity management system 100 is shown as including a cryptographic data 110. In a preferred embodiment, the cryptographic data 110 includes data that has been subjected to cryptographic functions such as cryptographic primitives including, but not limited to one-way hash functions and encryption functions. The cryptographic data 110 is shown as comprising data sub-parts 111A-M. It should be understood that there can be any number of data sub-parts 111 comprising the cryptographic data 110. In fact, although shown and described as cryptographic data, the cryptographic data 110 can be partially subjected to cryptographic primitives or not subjected to it at all. However, the preferred embodiment comprises hashing the cryptographic data 110. By way of another example, the cryptographic data 110 can include a single sub-part 111, thereby representing the full data set of the cryptographic data 110, or up to sub-part 111M thereby including M sub-portions of the cryptographic data 110. In yet another embodiment, a selected sub-part 111 can overlap with the data in another sub-part 111. In other words, the same portion of data can be maintained in two or more separate sub-parts 111. Similarly, sub-parts 111 can also contain only unique data from each other. The personal identity management system 100 is suitable for use with any type of storage 112, such as a decentralized distributed storage, including, but not limited to, for example, a distributed hash table, a distributed database, a peer-to-peer hypermedia distributed storage (e.g., InterPlanetary File System (IPFS)), a distributed ledger (e.g., Blockchain), an operating memory, a centralized database, a cloud-based storage, and/or the like. In other embodiments, the storage 112 is not decentralized or comprises a combination of distributed, decentralized servers, and centralized servers. In even further embodiments, the storage 112 can be maintained in operating memory of any component in the system 100. In a preferred embodiment, the storage 112 allocates each data sub-part 111 to one or more storage nodes 113.

Figure 2:
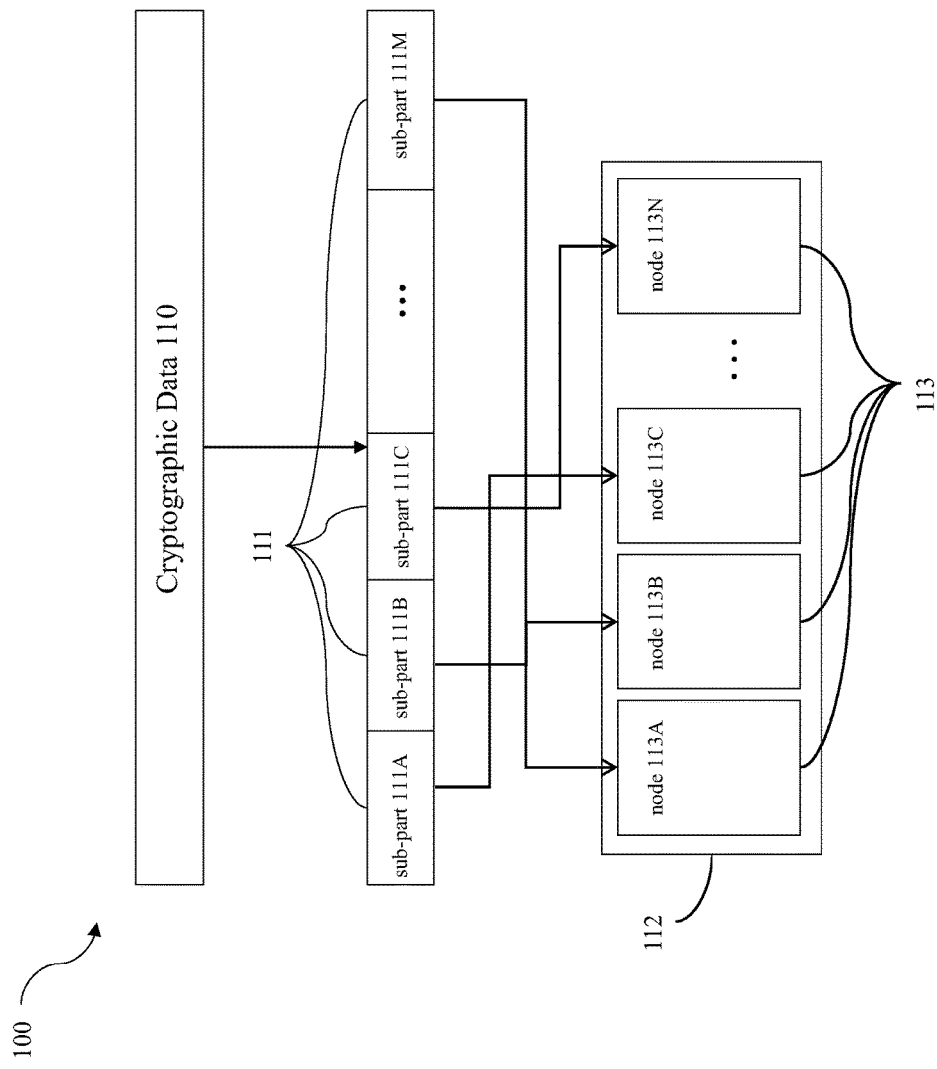
FIG. 2 is an exemplary top-level block diagram illustrating one embodiment of the cryptographic data of FIG. 1 being stored across a plurality of nodes within a distributed storage.

In some embodiments, the system 100 comprises any number of storage nodes 113 as shown on FIG. 2, each having at least one processor and at least one physical or virtual/cloud-based storage (not shown). In another embodiment, the storage nodes 113 can comprise operating memory-based storage. In yet another embodiment, the storage nodes 113 can have both physical, virtual/cloud-based storage, and an operating memory (not shown) to store data.

In a preferred embodiment, a selected storage node 113 does not comprise a complete set of data. For example, as shown in FIG. 2, a selected node 113, such as one of the storage nodes 113A, 113B, 113C, or 113N, maintains a fraction of the cryptographic data 110. In the event of a security compromise, data stolen from a selected node cannot be used for any meaningful purposes (e.g., human readable) because it represents an incomplete set of the raw data 115 (or only the hashed view, for example, of the cryptographic data 110). FIG. 2 illustrates a preferred embodiment for partitioning the cryptographic data 110, and stored on one or more storage nodes 113, such as 113A, 113B, 113C, and 113N—across the storage 112, for maximum security. As shown in FIG. 2, the data sub-parts 111A, 111B, 111C, and 111M are stored in one or more storage nodes 113 in the storage 112. In a preferred embodiment, if the cryptographic data 110 includes N sub-parts 111, and there are M storage nodes 113, the number M of storage nodes 113 is greater than the N sub-parts 111. Although shown and described in FIG. 2 as representing physical structures, it should be understood that each component of the storage 112 can virtualize several independent storage nodes 113 as a virtualized system.

In accordance with yet another embodiment, each sub-part 111 can be stored within one or more storage nodes 113 in parallel, to provide integrity, availability, and partition tolerance for the data. This contributes to a secure infrastructure, where a standalone node cannot become a single point of compromise.

In a preferred embodiment, the storage 112 enables adding new data, and prevents changes and/or removals of the data. In an alternative embodiment, at least one storage node 113 is provided with at least one processor configured to run a set of predefined operations to ensure that data can only be added.

Figure 3:
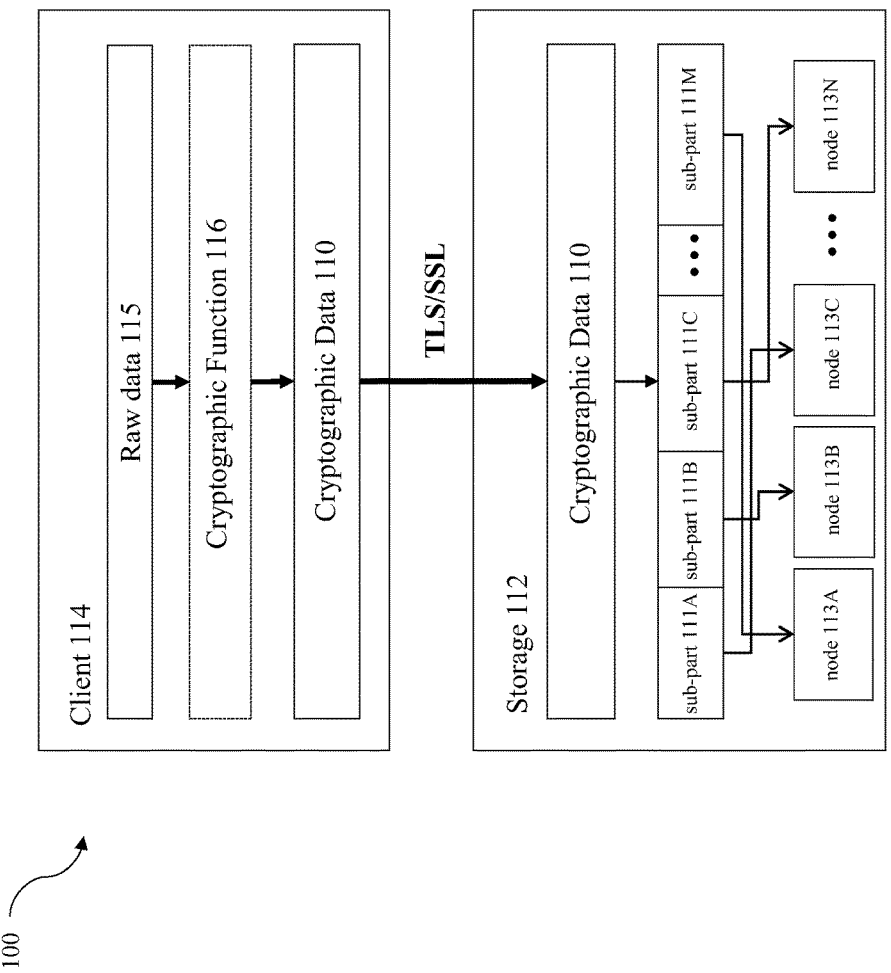
FIG. 3 is an exemplary detailed functional block diagram illustrating one embodiment of a data transfer process from a client side into the distributed storage of FIG. 2.

In some embodiments, as a further security layer, all data transferred between a client 114 and the storage 112 can be protected using a secure connection (e.g., TLS/SSL, cypher, encoding, or any strong cypher together with (or without) SSL) such as shown in FIG. 3. Turning now to FIG. 3, one embodiment of an exemplary data transfer process from a variety of sources into the storage 112 is illustrated. As shown, a client 114 provides raw data 115 to a cryptographic function 116 (e.g., a cryptographic primitive such as a one-way hash function or an encryption function) to generate the cryptographic data 110. The cryptographic function 116 can include, for example, secure hash algorithm (SHA)-2, SHA-3, or any other reliable cryptographically strong hash function. The raw data 115 can be of any nature, any complexity, any size, and of any structure. For example, any binary data, such as data of 1-byte length (e.g., text file) to a 5 TB video file—can be hashed.

The cryptographic data 110 is then partitioned into the sub-parts 111 for storage on any number of selected server nodes 113 of the storage 112. As used herein, partitioned can include splitting, slicing, and any division or decentralization of data. In this preferred embodiment, the raw data 115 advantageously is not transferred through any unsecured (or even secured) medium between the client 114 and the storage 112.

Figure 10:
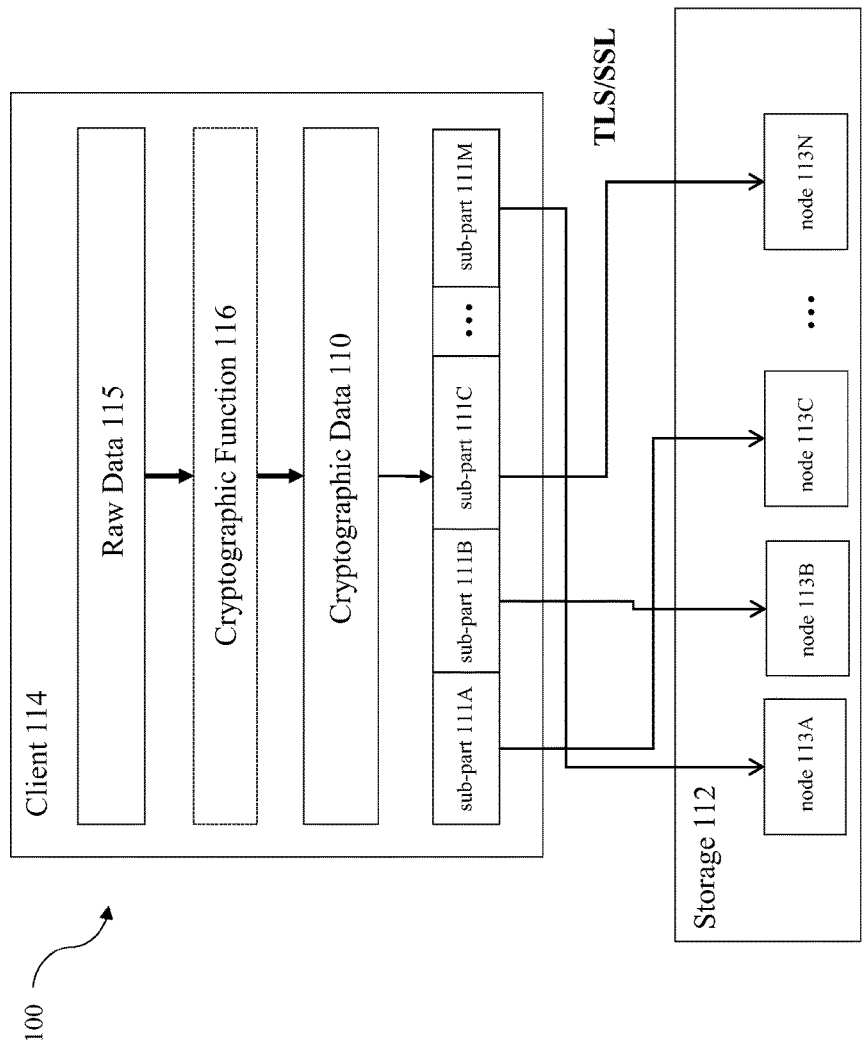
FIG. 10 is an exemplary detailed functional block diagram illustrating another embodiment of the data transfer process of FIG. 3 wherein the data partition occurs on a client side.

Although FIG. 3 illustrates the cryptographic data 110 being partitioned in the storage 112, the cryptographic data 110 can also be partitioned into the sub-parts 111 on the client 114, such as shown in FIG. 10. As illustrated in FIG. 10, once the raw data 115 is processed through a cryptographic function 116, the cryptographic data 110 is partitioned into the sub-parts 111 prior to being stored in the storage 112. In yet another embodiment (not shown), the cryptographic data 110 can be partitioned on a combination of the client 114 and the storage 112.

Advantageously, by processing the raw data 115 through the cryptographic function 116 on the client 114, the system 100 does not maintain data in the open form in the storage 112. Accordingly, it is difficult for anyone to receive or steal personally identifiable data or any other meaningful data in its original easily accessible form—which is the standard open form typically used by conventional databases.

Each client 114 can generate a pair of cryptographic keys: a public key and an associated (large) private cryptographic secret key. In some embodiments, the system 100 can include at least one server-side processor to generate these pairs of keys. In another embodiment, a processor of the client 114 is configured to generate these key pairs. Yet another embodiment includes both server- and client-side processors to generate the pairs. The public key can represent a unique identifier of a selected user. In some embodiments, a secret key can be stored on the client 114 in a special vault. In an alternative embodiment, secret keys can be stored within the operating memory of the client 114.

In a preferred embodiment, any form of stored data (e.g., cryptographic data 110 shown in FIGS. 4 and 11), includes at least one set of identification data 118, which allows the system 100 to determine exactly one unique set of personal identifiable information (PII) among the entirety of the storage 112. Each set of identification data 118 is associated with a predetermined level of significance representing the level of trust in terms of cross checks and verification. The system 100 distinguishes between "knowledge of the data transferred or input" from "verifying or trusting the very same data." Therefore, initial generation of the cryptographic data 110 is treated as unverified, and as the system 100 receives more feedback about cross checks and verification of any data/identity attributes, the predetermined level of significance (or trust level) increases. The higher the significance level/assigned level of trust, the more accurate and credible the stored data becomes within the system 100. As used herein, the data verification process can also include assigning an aggregated trust score to any individual data set as discussed herein, as well as any other flags, warnings, and other markers attached to data points or data sets.

In some embodiments, a combination of a public key along with the specific data credential sets (which act as identifiers/attributes to cross check within the system 100) are processed through cryptographic primitives (either on the client 114 or the storage 112) and stored within the storage 112, as personal identity data which can be cross checked for existence and whose attributes can be independently cross checked and verified.

The user's public key can be used to verify the signature of a user who has verified some data. It can also be used to verify any other flags, warnings, and other markers attached to data points or data sets as part of the risk-assessment or scoring within the system 100. However, the public key is not used to determine the existence of the personal data within the storage 112. For example, a selected user can verify their own personal data as they are in possession of their raw data 115.

Figure 4:
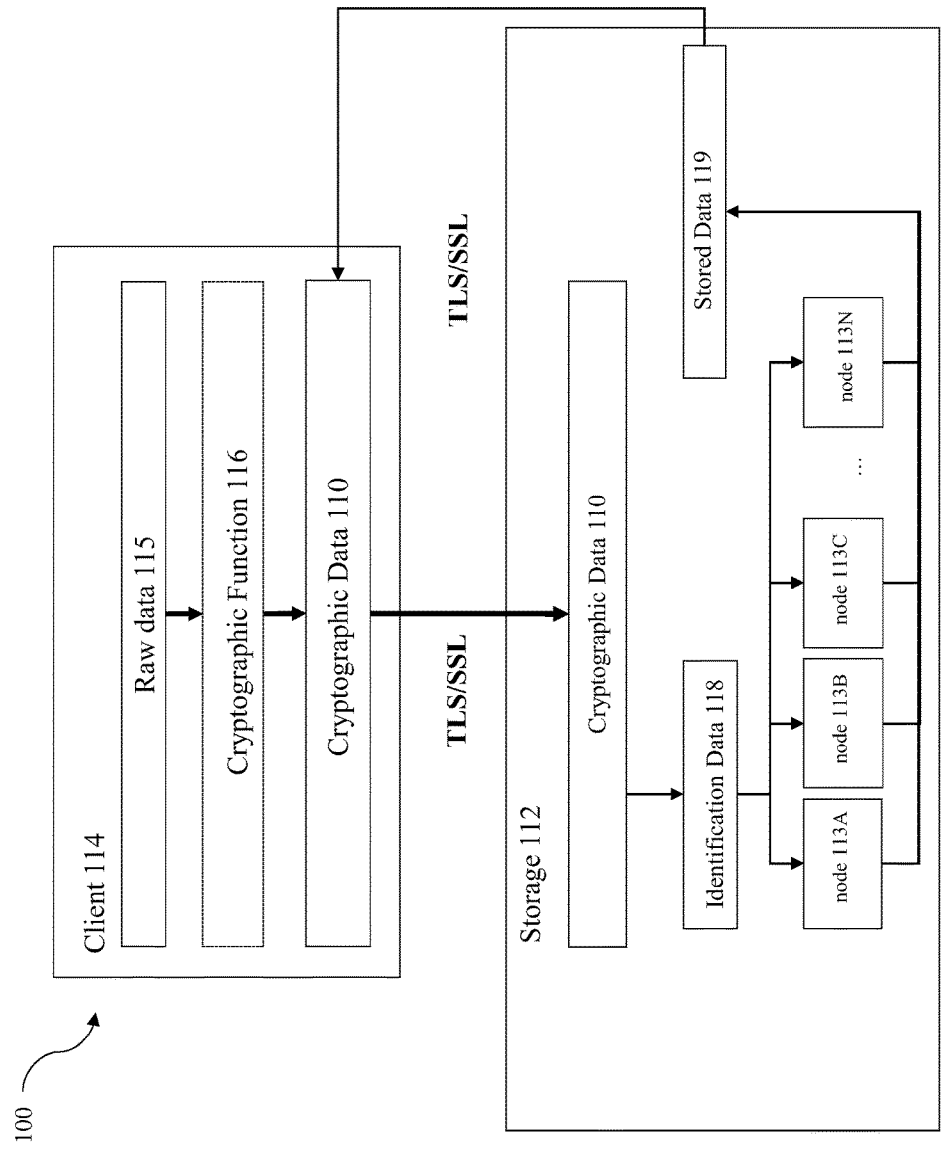
FIG. 4 is an exemplary detailed flow diagram illustrating an embodiment of a data lookup for existence within the distributed storage of FIG. 2.
Figure 11:
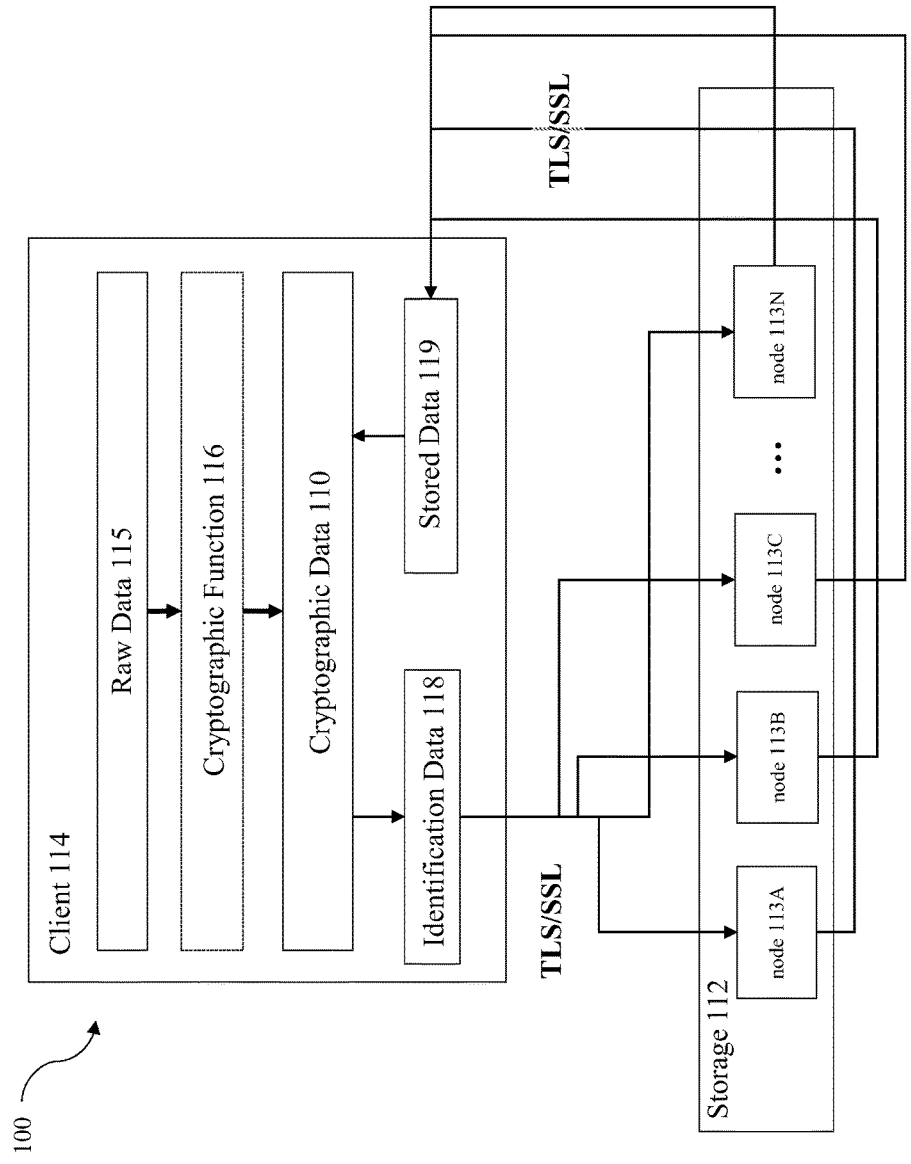
FIG. 11 is an exemplary detailed flow diagram illustrating another embodiment of the data lookup of FIG. 4 wherein the identification data is extracted on the client side.

Turning to FIG. 4, an exemplary process of determining whether the input data exists within the system 100 is shown. The system 100 can determine the existence of any of the personally identifiable data without maintaining the raw data 115. Each raw data entry 115 that needs to be checked against existing entries is processed through the cryptographic function 116 on the client 114. The cryptographic data 110 is sent to the storage 112, preferably via a secure connection such as TLS/SSL. FIG. 4 illustrates that the data partition occurs on the storage 112; however, the data partition can also occur on the client 114 and transmitted to the storage 112 in sub-parts 111 to locate a stored data 119 match as shown in FIG. 11.

Returning to FIG. 4, the storage 112 extracts several sets of data identifiers 118 from the cryptographic data 110, and uses the data identifiers 118 to locate an exact record match as stored data 119 from the storage nodes 113. The system 100 then determines whether the raw data 115 already exists in the storage 112 to check potential errors in any combination of the data sets (e.g., the cryptographic data 110, the raw data 115, the data identifiers 118, and the stored data 119)-based on comparing and checking credential sets from client side as well as from the system 100 storage, such as shown in FIG. 5.

Figure 5:
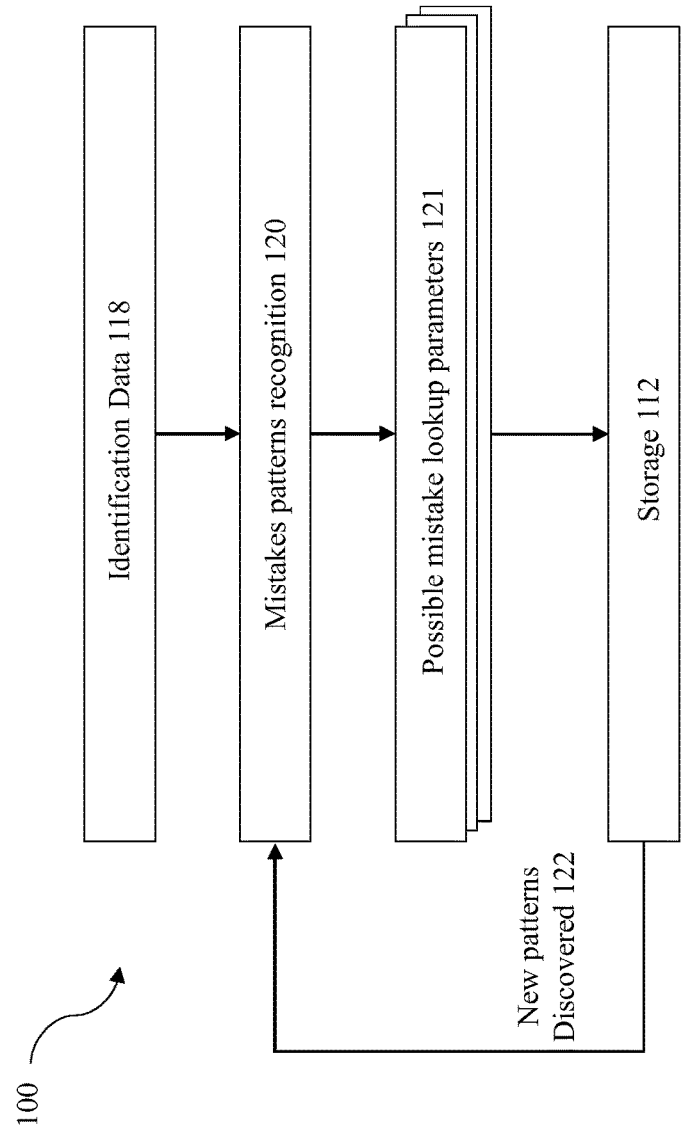
FIG. 5 is an exemplary detailed block diagram illustrating one embodiment of the data verification and check process, such as for duplication and prior transactions within the distributed storage of FIG. 2.

FIG. 5 illustrates an exemplary process for searching for potential mistakes within the cryptographic data 110 or the identification data 118, and determining whether existing records are duplicative of other entries within the storage 112. As shown, the storage 112 defines error patterns 120 that can be cross-referenced and checked against the stored data 118 and/or the identification data 118. Using the identified mistake patterns 121, the storage 112 locates similar records and, if successful, each new discovered pattern 122 is added to a patterns database (not shown).

In some embodiments, if the required credentials set is presented to the system 100, but a data match still cannot be found, the system 100 searches for possible errors, for example, by successively excluding one field (e.g., the data identifiers 118, the error patterns 120, exact record match 119, the identified mistake patterns 121, and the new discovered pattern 122) after another, via a trainable neural network, or any other decision making process depending on the business logic and purposes thereof.

By way of example, the process shown in FIG. 5 includes:
1) a client wishing to check the existence of and/or verify data sends that cryptographic data 110 to the system 100;
2) the system 100 searches for identifying credential sets in this data—to find a unique record in the database (only hashes, no open data).

Each credential set has its level of significance, for example:
first name+last name+birthdate+passport no=>max level;
first name+birthdate+passport no (without last name) =>max level minus 1;
first name+last name+passport no (without birthdate) =>max level minus 2;
and so on;
3) if the system 100 does not locate any set of credentials corresponding to the sent data, it returns an error or another response which indicates no data was found;
4) if the system 100 finds at least one credential set, the system 100 searches for such credentials in the storage 112;
5) if there is no such data, the system 100 searches for possible mistakes (e.g., the error patterns 120 and/or new patters 122), by excluding one field after another and searching for similar data;

Searching for identifying credential sets in this data advantageously provides a high degree of confidence and accuracy-minimizing false negatives and maximizing true positives.

In some embodiments, personal identifiable information (PII) coupled from various inputs of the raw data 115 or the cryptographic data 110 can be used for 1-1 matching, or 1-many matching. Within this context, the system 100 then turns Personally Identifiable Data (PII) on the client 114 into a cryptographically secure form and then requires 1-1 matching accuracy to be maximum in order to guarantee maximal statistical separation between unique data sets and attributes of any identity.

The method described herein allows for the advantages of DNA sequencing, such as providing a high integrity and uniqueness of data preserved to the highest point of security and individuality, which would give the advantage of developing a unique digital representation of an individual and their identity attributes much like a Digital DNA.

Figure 6:
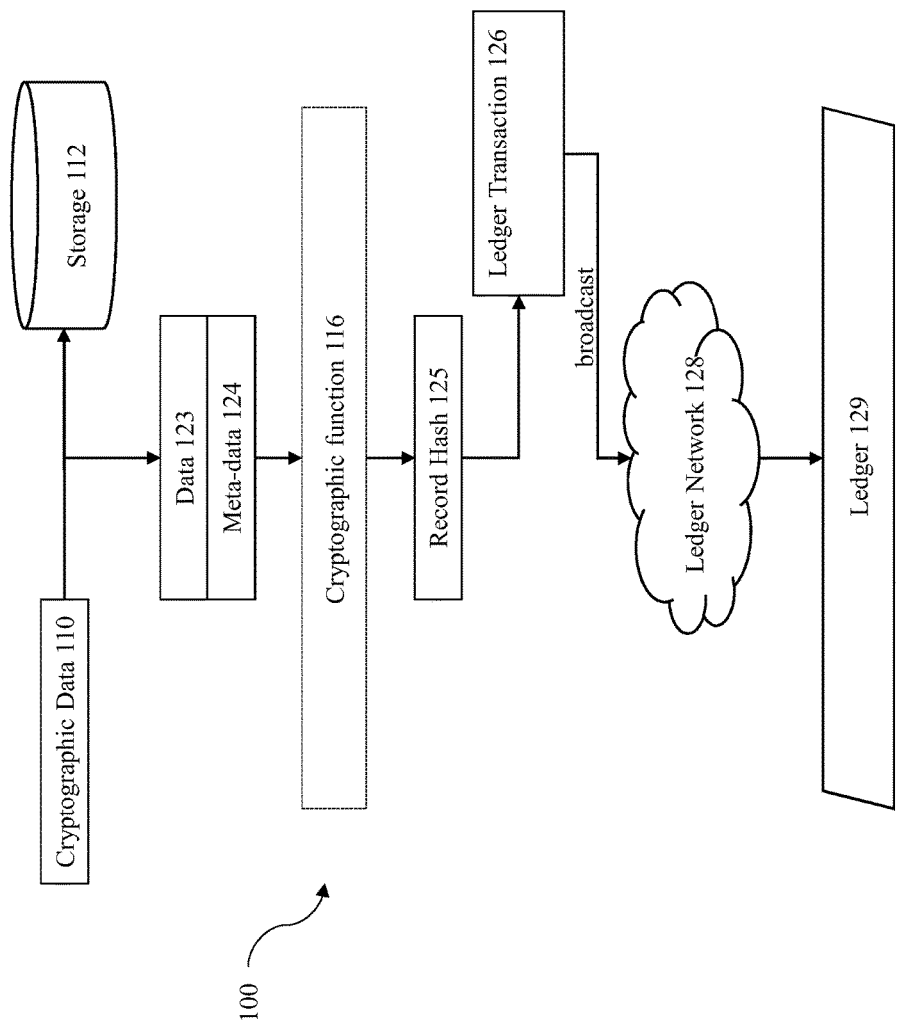
FIG. 6 is an exemplary flow diagram illustrating one embodiment of a recording process and a transaction inside the distributed storage of FIG. 2.

In some embodiments, the system 100 also encodes data about each data input, data call, or associated markers for data assessment by the client 114 onto a distributed ledger, such as the ledger 129 shown in FIG. 6. The system 100 is suitable for use with a wide range of ledgers 129, such as any immutable distributed ledger, including, for example, a public Blockchain (e.g., Bitcoin® Blockchain, Ethereum® Blockchain, etc.) and/or a private Blockchain and/or the like. In some embodiments, the storage 112 could be the same as the ledger 129. In some embodiments, the ledger 129 comprises a combination of public and/or private Blockchains. In some embodiments, the system 100 provides the safety and integrity for multiple amounts of records and events within the system 100, all within the parameters of a single ledger transaction on the ledger 129. In some embodiments, each transaction corresponds to a single event within the storage 112. In alternative embodiments, each transaction represents a set of events or records within the storage 112.

Each new record (or combination of records) of a transaction within the storage 112 and the client 114 generates a ledger transaction 126 into the ledger 129 as shown on FIG. 6, which allows anyone to verify and validate the existence and accuracy of this data entry. Turning to FIG. 6, a preferred embodiment of verification includes analyzing the cryptographic data 110 in combination with a digital signature for the ledger transaction 126 that is provided to the ledger 129. Advantageously, anyone can validate the existence of the PII based on the cryptographic data 110 using the storage 112 and the ledger 129. In some embodiments, the system 100 can secure several independent cryptographic data 110 within a single ledger transaction 126, within the ledger 129 (shown in FIG. 8). With reference to FIG. 6, recording each ledger transaction 126 into the ledger 129 and the storage 112 is shown. As shown, the cryptographic data 110 is stored in the storage 112, while also being divided into core data 123 and metadata 124. In some embodiments, metadata 124 is not present within the cryptographic data 110, so core data 123 is equal to the cryptographic data 110. Metadata 124 can also be derived from external sources (not shown) and determined from other variables (e.g., timestamps). Both the core data 123 and the metadata 124 can be processed using the cryptographic function 116. A record hash 125 is shown as being generated from the metadata 124 and the core data 123. In some embodiments, the record hash 125 corresponds to the core data 123 (such as when metadata 124 is empty). The record hash 125 is distributed to the ledger transaction 126 as additional information. For example, when the ledger 129 represents a Bitcoin® Blockchain, and the ledger transaction 126 represents a Bitcoin® Blockchain transaction, the record hash 125 is written into an 'OP_RETURN' field of the ledger transaction 126. The ledger transaction 126 is broadcast over a ledger network 128. As soon as a new block (reflecting the transaction) is created on the ledger 129, the record(s) which the system 100 has placed within the ledger transaction 126 is secured inside the ledger 129 itself. Stated in another way, once the ledger transaction 126 is in the block, it is difficult to revert or tamper it, so it is difficult to change its history. A record hash 125 is written to the transaction and anyone in possession of the raw data 115 can produce the same cryptographic data 110, check its existence within the storage 112, and validate/verify information input using the ledger 129.

Advantageously, the system 100 doesn't just provide a system of information claims and results, which users are expected to blindly trust. Instead, the system 100 provides users with an independent verification of the results via the ledger transaction 126 directly, entirely by-passing the suggested system in order for users to check the results for themselves. As discussed, this independent verification ensures complete transparency in terms of the integrity of the records of the system 100 and both the claims and the results which the system 100 is able to provide to the requesting clients 114.

Furthermore, in a preferred embodiment, the storage 112 does not maintain data in its original or open form. In contrast, the raw data 115 can be first processed through the cryptographic function 116 on the client 114 as shown in FIGS. 3 and 10. This is advantageous in that hashed stored data cannot be reverse-engineered back to its original form in any way, even if a hacker were to obtain access to the data in full hashed view. In some embodiments, the personal identification management system 100 can have at least one processor on a client-side 114 configured to perform cryptography primitives on PII data sets (e.g., the raw data 115 and/or the cryptographic data 110).

Any input into the storage 112 as described above is followed by the generation of one or more ledger transactions 126 made in the ledger 129 as shown in FIG. 6, to provide a fully secured and trusted way of immutable data storage, validation/verification and authentication. As used herein, immutable applies to the principle that once data has been written to a blockchain, the data is difficult to manipulate, for example, even for a system administrator.

Figure 7:
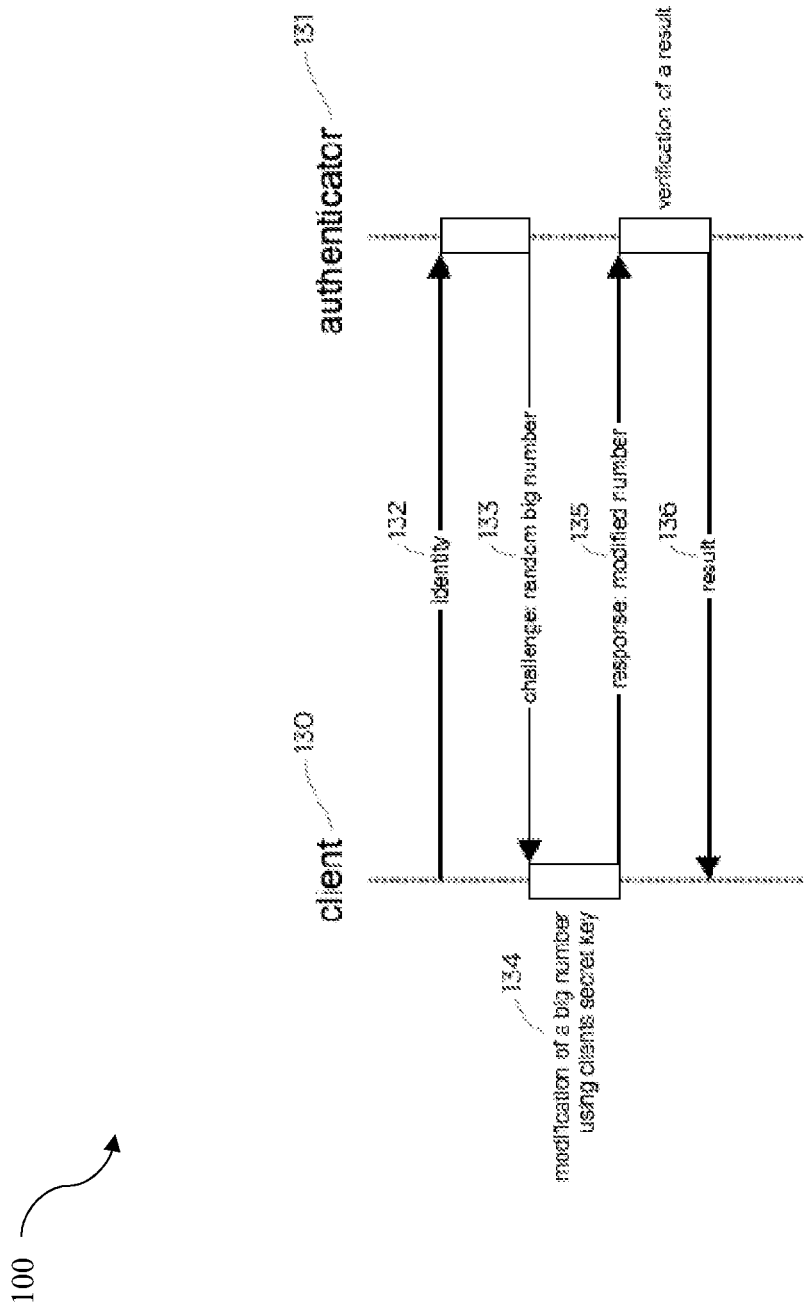
FIG. 7 is an exemplary flow diagram illustrating one embodiment of zero-knowledge authorization process.
Figure 9:
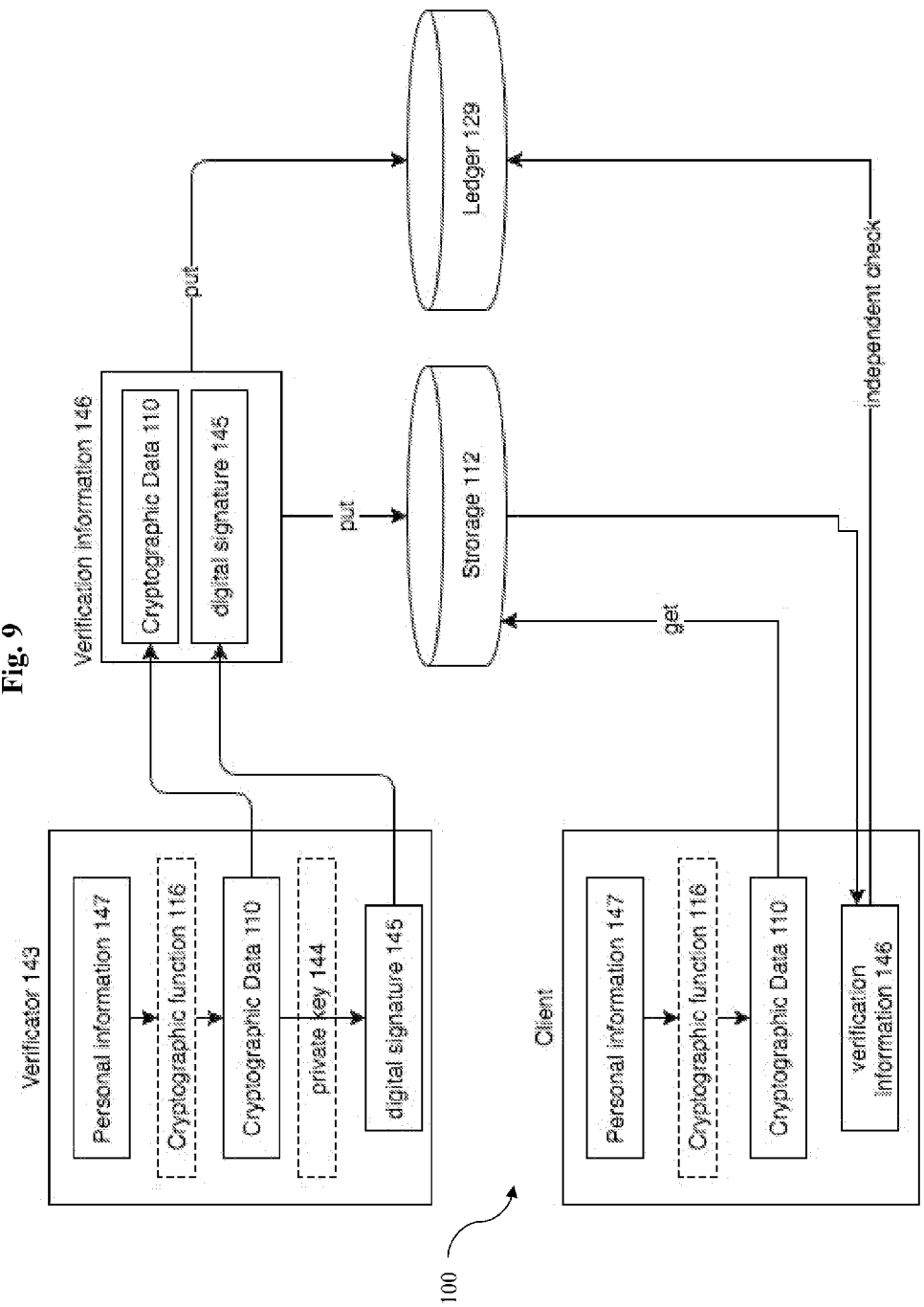
FIG. 9 is an exemplary functional block diagram illustrating one embodiment of a verification process that can be used with the distributed storage structure of FIG. 1.

Each individual user of the system 100, such as a corporate member or a relevant authority can be issued with a (preferably large) cryptographic secret key (such as modifications 134 of FIG. 7, a private key 144 of FIG. 9). In some embodiments, the large cryptographic secret key can comprise a Rivest-Shamir-Adleman (RSA) key, an elliptic curve cryptography (ECC) key, and the like. Due to the known unique features of ECC, this large cryptographic secret key can be freely split into any number of independent parts (factors). These factors can be of any nature—some examples include, but are not limited to: tokens, passwords, biometric data and pin-codes. Particular embodiments include storing some parts on a physical memory, such as flash drives. Also, each component of the secret key can be additionally encrypted to increase the complexity of its partition. Each factor points to a specific location on a single elliptic curve based on the principles of elliptic cryptography (ECC), as an approach to public-key cryptography based on the algebraic structure of elliptic curves over finite fields. ECC requires smaller keys compared to non-ECC cryptography (based on plain Galois fields) to provide equivalent security.

In this ECC example, the storing of the parts, which the keys can be broken up into, can be decentralized and distributed in any number of storage nodes 113, such as distributed key management structure and entirely decentralized trust authority, not one central one, and in fact they could be offline or can be not stored nowhere at all. In a further embodiment a system comprises an unlimited number of server nodes each one having at least one processor to perform data encryption/decryption and client's requests execution. It additionally eliminates the necessity to store any parts of information relevant to the secret key, particularly there is no need for them to be stored in one place. This significantly decreases the possibility of unauthorized access to the data/PII and provides higher protection for both individuals and organizations. In some embodiments, client-side vaults store some parts of a client's private keys. In other embodiments, these portions of private keys are not kept and can be requested from a client with each request to a servers. Another embodiment can include a client-side processor to obtain and combine all parts of the secret key from a client before interacting with a server nodes.

In a preferred embodiment, the system 100 overcomes limitations of typical conventional systems:

1) It is difficult to store anything meaningful within conventional ledgers, for example, because conventional ledgers, by design, are not a suitable storage solution, and normally there is a limited length of the rare fields within which any independent recording can be possible; furthermore, such ledgers face a limitation connected with the speed of creating and reading records placed within them—connected to the limitations of timing in block creation for such ledgers;

2) It is also difficult to fully protect anything meaningful within any conventional data storage such as relational databases, data warehouses, and so on.

Therefore, the storage 112 of the system 100 is in fact protected within the ledger 129 itself for security through the immutable ledger protocols.

Thereafter, any record within the storage 112 can be checked/validated/queried/verified in a decentralized and independent manner by any of the parties who already are in possession of the raw data 115 and are trying to check it for existence. Without any knowledge of the raw data 115, nothing can be checked and therefore can't be hacked/stolen by potential attackers. One embodiment of the check/validation process is shown in FIG. 9.

System 100 advantageously considers the need to store zero personally identifiable data (which by itself, embodies the very concept of privacy by design). In addition, system 100 checks the personally identifiable data and, specifically, in a manner whereby these checks (including but not limited to verifications, flags, warnings, etc.) are recorded in such a way that it would be impossible to fake or adjust, all the while not storing any of the raw data 115 within the system 100.

Furthermore, the system 100 stores neither initial personally identifiable data, nor information about verifications of the personally identifiable data within any traditional storage per se. In order to achieve this, and instead of storing anything that is able to be reverse engineered (or human readable), the system 100 duplicates the results of each verification into—both the storage 112 as well as into the ledger 129 as shown on FIG. 6. Were it that either the initial data or that it's verification was actually 'stored' elsewhere or in a current method of 'all eggs in one basket', both of the data and it's verifiers could be easily hacked or faked.

Figure 8:
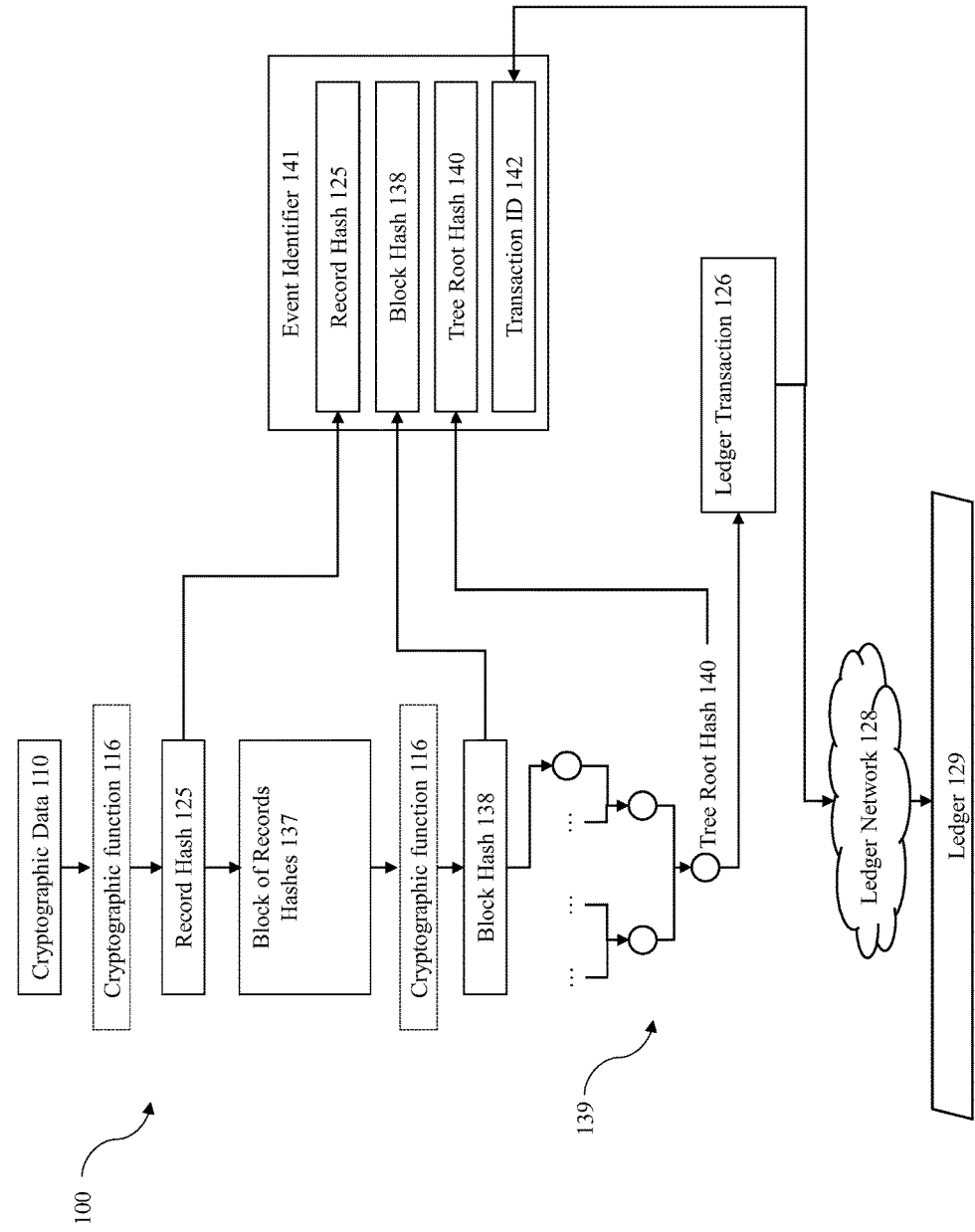
FIG. 8 is an exemplary flow diagram illustrating one embodiment of an exemplary recording process and transaction of FIG. 6 and includes an event identifier generation process.

Moreover, since the protocols of the ledger 129 (especially public ledgers) are strict and do not allow records to be made by just anyone in any form, as well as the fact that the speed of recording in the ledger 129 is limited, the system 100 can negate both of these negative processes by using hash trees, as well as not storing any of the raw data 115 as shown in FIG. 8.

The advantage of the system 100 is thus in the difficulty of a) not storing any of the raw data 115 b) not storing any cryptographic data 110 in its raw, original form (which can also be de-crypted or hacked and reconstructed for meaning and potential maluse c) system 100 works with hashed and, in some embodiments split cryptographic data 110, which even in the case of being hacked, would be impossible to restore back to its initial form of raw data 115, or cryptographic data 110—which is data defense through mathematics. Therefore, when the cryptographic data 110 is not stored in any original non-partitioned form in the preferred embodiment, the system 100 is protected from well-known attacks on hashes, such as through brute-force, rainbow attacks, and so on.

Moreover, each result of each verification is encoded within the ledger 129 and protected within the ledger 129. The immutable ledger 129 protects the exact record as encoded by system 100, because once the ledger block containing this record has been generated, and broadcasted/propagated to the network, it is difficult to change.

Therefore, what system 100 does keep a record of is component parts of utterly useless cryptographic data 110 sub-parts 111 as shown in FIG. 1, which no one would benefit from hacking in any way; it also stores a duplicate record of the ledger transaction 126 as shown in FIG. 6 of each verification within the system 100, whereby the duplicate encoded on the ledger 129 becomes both immutable and publically available for an existence-check (provided that the existence-check is being performed by someone already in possession of the raw data 115, one cannot check data which one has no access to); the advantage of this process of the system 100 is that the cross-check becomes a decentralized process, foregoing the system 100 as a mediator, the cross-check is thus independent.

Advantageously, while not storing any raw data 115 (or even "raw" hashes such as cryptographic data 110), the ability of system 100 is maintained in that it can provide confirmation as to whether it exists or doesn't; whether there are any errors within it/whether there are similarities with other existing data (existing data meaning open form data, not referring to any data within system 100 since it stores no data in open, original form);

Simultaneously, any reference to system 100 verifications are held in an incomprehensible form for any attacker; and does not allow for any forgery of either the verification itself or the history of said data verification. This therefore can guarantee the ability for external cross-checks of any verifications which can fully by-passes system 100 directly via the parallel records of that verification which were made at the time when it was duplicated onto the immutable ledger 129 (thus negating the issue that any verifications within system 100 could be hacked or falsified—if the verifications don't compare 1 to 1, the system 100 does not accept the verification).

Unlike ledgers, individual identity sets or their attributes are not binary. In order to create the above advantages, the system 100 is based on an adaptive strategy to distil and arrange the infrastructure of PII. Since, unlike public Blockchains—wherein identity sets are not binary, but instead can contain many attributes and moving/changing parts, the system 100 provides the complexity of both storing zero meaningful data while also providing verifications and duplicating them into the immutable ledger 129.

The authorization process is a zero-knowledge proof, based on strong elliptic curve cryptography, and a challenge-response protocol for verification of possession of this secret key.

An example authorization process is shown in FIG. 7 as a sequence diagram of zero-knowledge authorization. As shown, a client 130 sends a special identity request 132 into an Authenticator 131. The authenticator 131 responds to the client with a challenge 133 of a random big number, as per RSA Factoring Challenge in encryption processes. The client 130 then makes the necessary modifications 134 of this big number using private/secret key to the client 130 and sends the new, modified big number 135 back to the authenticator 131. The authenticator 131 checks the modified big number from the client 114 and responds with the result 136 as to whether the challenge-response was correct.

To add a check or a verification to any raw data 115, a verification authority or a client must create the cryptographic data 110—this can be accomplished by using, for example, the cryptographic function 116—and then the authority/client can create a digital signature based on the cryptographic data 110 using it's own secret key. Information about this check or verification is also stored in the storage 112. Like any other transaction within the system 100, information about this verification is also secured in a ledger 129 and is accessible and available publicly. The authorization process disclosed herein is a zero-knowledge proof of possession of this secret key. According to some embodiments, a selected storage node 113 includes at least one processor to perform the authorization process based on a zero-knowledge proof of work.

Any stored or transferred data must contain at least one set of credentials such as data identification 118 and/or identity data 132. This allows the system 100 to determine exactly one match to a data set or to one set of credentials based on the comparison of data within the storage 112.

Each set of credentials has its own level of significance for performing a data search within the system. For example:
first name+last name+birthdate+passport no=>max level;
first name+birthdate+passport number (without last name)=>max level minus 1;
first name+last name+passport number (without birthdate)=>max level minus 2;
and so on;

The identification process (as opposed to the authorization/verification process) of a user identity the attributes of personally identifiable information (PII) can thus be reduced to a successful query within the storage 112, where a full set of the raw data 115 has been processed through the cryptographic function 116. In this process of providing the cryptographic data 110 for identification within the system 100, at least one set of the user's unique credentials must be included.

In order to provide both trust and security needed to solve the issues of managing personal information, and in order to eliminate the possibility of any hacks or fraud, each and every data/PII/identity transaction that occurs within the storage 112 is recorded in the ledger 129, which stores within itself all the existing records of transactions ever made. In some embodiments, the system 100 can have a processor configured to produce transactions into the ledger 129 immediately after any operation is performed with data within the system 100.

An example of a detailed process of recording information into ledger 129 and how an Event Identifier 141 is created is shown in FIG. 8. A cryptographic data 110 is hashed again using a cryptographic function 116—creating a Record Hash 125. Several of these Record Hashes 125 can be placed inside a new Block of Records Hashes 137. Once the block 137 is full, the Block of Records Hashes is hashed again, using a cryptographic function 116—creating a Block Hash 138. In some embodiments, each block 137 can contain a single record hash 125, or Block Hash 138 could be equal to the record hash 125 itself. In other embodiments, the record hash 125 could be equal to the cryptographic data 110 and the Block Hash 138 could be equal to the cryptographic data 110. In other words, the cryptographic data 110 could be used without additional hashing for further steps and could be viewed as Block Hashes 138. In some other embodiments, any number of hashing rounds could be applied to any of the steps producing record hashes 125 and Block Hashes 138. Several of these Block Hashes 138 are then placed inside of a tree 139 with a root—creating a tree Root Hash 140. The Root Hash 140 is then placed into the ledger transaction 126. For a Bitcoin Blockchain, for example, the ledger transaction 126 could be achieved by adding Root Hash 140 to an 'OP_RETURN' field of the ledger transaction 126. That same ledger transaction 126 is then broadcast out onto the network 128, and the system generates a transaction identifier within the ledger 129—creating a Transaction ID 142. Thereafter, the Record Hash 125, the Block Hash 138, the tree Root Hash 140 and the transaction ID 142 are all used to generate an Event Identifier 141, and as soon as a new block on the ledger 129 is created, this Event Identifier record 141 is secured inside of the ledger 129.

As demonstrated in FIG. 9, a Verificator 143 comprises the cryptographic function 116 to generate the cryptographic data 110 from the Personal Identifiable Information (PII) 147; the party verifying this data set uses a private key 144 (or secret key) in order to generate a digital signature 145 which is layered over the cryptographic data 110 that is being verified. In a preferred embodiment, the private key 144 is unique for each user etc.

The resulting unique verification information 146, which includes both the cryptographic data 110 (generated from the raw data 115) as well as the digital signature 145 (generated from the party that is verifying this raw data 115) is then stored within the storage 112 as well as within the ledger 129—both of these storages are thus performed simultaneously or in parallel.

Any client 130 who may wish to check the prior existence of PII 147 (or any raw data 115) as well as it's veracity and any associated attributes or verifications about the PII 147, the raw data 115, the cryptographic data 110, and so on, will also use the same cryptographic function 116, in order to generate the cryptographic version 110 of Personal Identifiable Information (PII) 147 and then send this cryptographic data 110 version of the raw data 115 into the storage 112, in order to perform a cross check of both its prior existence within the system 100, as well as any relevant verification information 146 in connection with the original set of PII 147.

The advantage of this process is that, should this verification information 146 already exists within the storage 112 of the system 100, then any client 130 who may wish to check it may perform an independent check directly on the available records within the immutable ledger 129 (which should match those within storage 112).

With respect to ECC, a large cryptographic secret key can be issued for every client, and can be un-restrictively split into any number of independent factors, due to the unique features of pair-based elliptic curve cryptography. These factors can be of any nature—some examples include, but are not limited to: tokens, passwords, biometric data or pin-codes.

Similarly with respect to ECC, each factor—or share—of such a secret key can be additionally encrypted to dramatically increase the difficulty of hacking it. Each part of the multi-step authentication process points on a specific location of a single elliptic curve. Moreover, storing of these fractions is decentralized and distributed in any number of nodes, and in fact does not have to be recorded anywhere at all.

These keys are never exchanged between clients 114 of the system 100. The need for any information related to part(s) of the secret/private key to be stored in one place is reduced, which significantly decreases any possibility of unauthorized access to personal data. Accordingly, any node compromise does not reveal any sensitive or usable information to potential attackers at any one point, significantly minimizing vulnerability down to making it near-impossible.

The systems and methods disclosed herein may be used in many different contexts in which Identity verification or access management is required, such as applications for external uses, including:

Online services, including dating/professional service providers, whereby individuals interact in the digital as well as the physical world—with an emphasis on name and age verification, background checks.

Employment—verification of work permits and entry documentation/immigration, as well as associated background checks on individual identity and their attributes.

Adult Entertainment-Age verification, payment verification, fraud detection.

Gambling—Age verification, payment verification, fraud detection, previous user history and associated credit checks.

Immigration and cross-border movement of individuals—identity documents checks, background checks and paperwork validity, citizenship and permits to travel, validating claims of identity and identity attributes.

Fintech—digital banking security, transaction security, identity claims for financial fraud and access to funds or financial services, clearance and compliance activity.

Debit/Credit Cards—Anti-money laundering (AML), fraud detection, transaction security, clearance verifications and card replacement authentication.

Credit referencing and rating agencies—assurance of identity, fraud, previous behavior history, risk-based assessments.

National and International Travel—identity checks for country of destinations and their border authority, no fly lists, Interpol, politically exposed persons (PEP) lists, relevant law enforcement and government authorities, border control agencies, airport infrastructure, security and customs.

Airline security, airline know your customer (KYC) processes, passenger identification and risk assessment, inter-airline passenger behavior history, flight manifest verification, passport and visa checks, passport verification, identity document verification, booking data verification and accuracy checks (including online and mobile booking), fraud detection for payment, fraud detection for loyalty program claims and abuses, identity claim verification, advanced passenger information systems (APIS) verification and passenger reputational scoring.

Data Entry—Correcting human error, automating correct entry process (e.g., Companies House data input (which is currently manual), International travel passenger data input, Credit referencing and rating agencies—all of this is manual, subject to human error and potential lack of attention to detail/quality staff training/impossibility of catching an error (for example, one as minute as a zero instead of the letter 'O').

Insurance-delayed flight insurance, credit card fraud insurance, mortgage insurance, payment default insurance. Risk assessment for insurance premiums calculations, as well as trust score used for premium payouts and claims assessments.

Government Services—taxation, pensions, income declaration, revenue and customs assessments, tax evasion, etc.

National and International Individual Identity—documentation for car hire, real estate, medical services, and the need to verify both its veracity and validity as well as assert ownership, or a transfer of ownership Legal records—verifying the existence of and veracity of claimed legally recorded proceedings and documentation, verifying their source and the individual to whom they pertain Fraud protection—decentralized automated and client-controlled monitoring for fraud activities and unusual patterns in identity use or behavior, aggregate risk assessment, fraud detection and prevention Need To Know Basis—permission—based Document exposure: similarly, the present system and method may be advantageously used to allow users who are members of a pre-defined group entering a closed system. This would include, for example, all employees of a company accessing that company's private network, or only those employees having specified security clearances accessing particular environments or documents in the private network.

Biotech: medical records, patient registry, administering correct treatment to the correct patient, drug development based on the individual's biometric data, verification of medical notes and their source, right to access medical help.

Compliance with new privacy laws such as general data protection regulations (GDPR), and Privacy by Design The right to be forgotten (e.g., erasing or removing PII data)

The right to privacy

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A personal identifiable information system for data management and authentication within independent computer systems and digital networks, the system comprising:
   a local client device for receiving raw data representing the personal identifiable information and comprising a cryptographic processor for processing the raw data through a cryptographic function to generate cryptographic data;
   a storage system communicatively coupled with the local client device and comprising one or more storage nodes on a remote server, the storage system being unique from the local client device, the one or more storage nodes for receiving and storing sub-portions of the cryptographic data, and wherein the raw data is never stored on the storage system; and
   a ledger database for parallel storage of one or more ledger transactions associated with any event associated with the storage system, wherein each ledger transaction comprises a record hash of core data and metadata, the core data and metadata being extracted from the cryptographic data.

2. The system of claim 1, wherein the ledger database comprises at least one of a public blockchain and a private blockchain.

3. The system of claim 1, wherein said storage comprises at least one of a distributed database, a distributed hash table, a peer-to-peer hypermedia distributed storage, an operating memory, a centralized database, and a cloud-based storage.

4. The system of claim 1, wherein a selected storage node maintains only a unique sub-portion of a complete set of the cryptographic data.

5. The system of claim 4, wherein a total number of sub-portions of the cryptographic data is less than a total number of storage nodes.

6. The system of claim 1, wherein the cryptographic function comprises at least one of a secure hash algorithm-2 and a secure hash algorithm-3.

7. The system of claim 1, wherein said local client device further generates a pair of cryptographic keys comprising a public key and an associated private key.

* * * * *